July 2, 1957 K. GREBE 2,797,586
APPARATUS FOR DRIVING CHAINS, CONVEYOR BANDS AND THE LIKE
Filed Dec. 18, 1953 4 Sheets-Sheet 1

INVENTOR
Konrad Grebe

July 2, 1957  K. GREBE  2,797,586
APPARATUS FOR DRIVING CHAINS, CONVEYOR BANDS AND THE LIKE
Filed Dec. 18, 1953  4 Sheets-Sheet 3

INVENTOR
KONRAD GREBE

BY Malcolm W. Fraser
ATTORNEY

July 2, 1957     K. GREBE     2,797,586
APPARATUS FOR DRIVING CHAINS, CONVEYOR BANDS AND THE LIKE
Filed Dec. 18, 1953     4 Sheets-Sheet 4

INVENTOR
KONRAD GREBE

BY *Malcolm W. Fraser*

ATTORNEY

United States Patent Office 2,797,586
Patented July 2, 1957

2,797,586

APPARATUS FOR DRIVING CHAINS, CONVEYOR BANDS AND THE LIKE

Konrad Grebe, Wuppertal-Elberfeld, Germany

Application December 18, 1953, Serial No. 399,111

Claims priority, application Germany December 29, 1952

21 Claims. (Cl. 74—221)

This invention relates to apparatus including chain wheels for driving chains, conveyor bands or the like, hereinafter called "chains," at points intermediate in their run. Its object is to improve the driving action of such apparatus, particularly to facilitate the engagement and disengagement of the driving elements of the chain wheel with a straight run of chain so that the driving elements successively release the driven elements of the chain without setting up any disturbing forces or exerting any undesirable upward or downward pressure on the driven elements. It is a further object of the invention to mitigate disturbances due to inaccuracies in the pitch of the chain, and to make the same chain wheel or wheels capable of use without reversal both for driving or braking, in both directions and on either run of the chain.

The invention is based on the recognition that the driving elements of a chain wheel rotating with uniform speed have a non-uniform speed relatively to a chain arranged tangentially to the chain wheel. With a theoretical form of chain the speed of each driving element relatively to the chain is greatest when the element is moving perpendicularly to the driven elements of the chain. On further rotation of the chain wheel, this speed drops, first quite gradually, and then, at an increasing rate, to zero when the chain wheel has turned through 90°. After rotation through a further 180° the driving element has again zero speed in the direction of the chain, and its speed, after a further 90°, again reaches its maximum. The increasing and decreasing parts of the curve of speed against rotation are mirror reflections.

In practice, the speeds of a driving element of whatever size will be the same as those which may thus be predicted theoretically if the elements are of the cylindrical form known per se, a diametral plane of each element being assumed to lie in the plane of rotation of the chain wheel so that the centre of the element lies on a radius of the chain wheel, and if the driven elements each present a plane face to such driving elements for engagement thereby.

When such cylindrical driving element comes to lie against such a driven element on the chain the driven element forms a tangent with the driving element. In this position pressure between the driving and driven elements acts perpendicularly to their engaging surfaces and the distance between the centre of the cylindrical driving element and the point of contact between the elements is in every position of engagement equal to the radius of the driving elements. The values of the components of speed of the driving elements in the direction perpendicular to the engagement faces of the driven elements which components may be predicted theoretically in the above manner, agree with the values found in practice, if the angular measurement is always taken through the centres of the driving elements. Where angular positions of the driving element are mentioned below they are therefore always the positions of the centres of the driving elements with respect to the centre of the chain wheel, and not those of the points of contact between the driving and driven elements. 0° always denotes the position which a driving element reaches at the highest point of its rotation, and the direction of movement of the chain is always assumed to be a tangent at this point, i. e. perpendicular to the radius of the chain wheel through this point.

It folows from simple geometrical considerations that the speeds of the driving element in the direction perpendicular to the driven elements of the chain are always highest when the radius of the chain wheel connecting the centre of the element with the centre of the chain wheel is parallel to the engagement faces of the driven elements so that the direction of motion of the driving elements at that moment coincides with the radius which connects the centre of the driving element with the point of contact between the elements. If the driven elements of the chain are perpendicular to the direction of movement of the chain the maximum speed of a driving element relatively to the chain is attained at the highest point of its rotation. If however the driven elements extend obliquely to the direction of conveyance in the plane of rotation of the chain wheel, the maximum speed of a driving element relatively to the chain is attained at a point which is displaced relatively to the highest point of its rotation by an angle equal to the obliquity. Expressed otherwise, when the radius of the chain wheel parallel with the obliquity of the driven elements of the chain points, for example to −9° the speeds of the driving elements at 0° and +10° in the direction of the movement of the chain are the same relatively to one another as the speeds of the driving elements at +9° and +19° in the direction of a chain the driven elements of which extend perpendicularly to the direction of conveyance. While in the latter case, when a driving element rotates from −90° by way of 0° to +90° its speed relatively to the chain rises from zero to the maximum and again drops to zero, in the former case the same speeds are obtained over the range −99° (via −9°) to +81°.

The invention avails itself of the differing speeds of the driving elements relatively to the chain during the uniform rotation of the chain wheel in order to improve the driving action of the chain wheel, the driving elements of which engage with a straight run of chain.

The invention accordingly provides apparatus for driving a chain as hereinbefore defined at a point intermediate in its run, including at least one chain wheel having driving elements fixed equidistant one from the next about the periphery of said wheel, means for rotatably mounting the chain wheel, a chain, means for movably mounting the chain to present a straight run in the region of the chain wheel, and a series of elements mounted on and movable with the chain and having engagement faces so as to be driven by the engagement therewith of successive driving elements each having, at constant-speed rotation of the chain wheel, a speed component perpendicular to the engagement face of the respective driven element which is greater on engagement with the driven element than on release therefrom, each driving element being in turn released from driving engagement with the respective driven element by the coming into engagement of a succeeding driving element with its respective driven element.

When it is desired to use several chain wheels, or groups thereof, with axes one behind the other in the direction of the chain run, the wheels are connected with each other such that they all rotate with the same speed, and such that the driving elements of one wheel or groups thereof differ from those of the next axially spaced wheel or group in their angular disposition with regard to the chain.

In all cases each driving element in turn which slows down is smoothly released from driving engagement with the respective driven element of the chain by reason of the element hitherto driven by it, or another driven element determining its speed, being driven by a faster driving element and outrunning the first driving element.

To achieve this result when the slowing down driving element engages a driven element of the chain forward of the driven element subsequently engaged by the faster driving element, i. e. in order that therefore the speed imparted to the rearward driven element is properly transmitted to the forward element, it is necessary, in a manner known per se, to guide the chain at least within the range of the driving apparatus, so that its links are prevented from jamming and cannot, or can only to a limited extent, force themselves one into the other.

In the arrangement according to the invention the engagement of the driving and driven elements, as well as their disengagement, is effected smoothly since each time a faster driving element catches up with a driven element the speed of which was hitherto determined by a slower driving element, it comes into engagement with that element without impact. The speed variations arising on disengagement of one driving element by the succeeding one are so slight that steady and uniform running of the chain is not impaired. On the contrary such variations only involve slight displacements within the range of the driving apparatus: the variations are, however, quite sufficient to improve the action of the drive materially.

In order to obtain the best results from the invention it is necessary to arrange the succeeding chain wheels as close behind each other in the direction of conveyance as possible. If a pair of chain wheels are arranged to rotate in parallel planes there is the advantage that the driven element of the chain which is engaged by a slowing down driving element of the first chain wheel can be taken over directly by a faster driving element of the second chain wheel. As soon as this element of the second chain wheel slows down a driving element of a third chain wheel if such is provided behind the second wheel, may directly engage with the same driven element so that each driven element of the chain is passed over directly from one chain wheel to the next following one. If now it is engaged by a driving element of the last chain wheel which then in turn slows down, it must be released by a driving element of the first chain wheel engaging the following driven element of the chain.

If only two chain wheels are arranged one behind the other, the distance between their shafts will accordingly be about equal to half the pitch of the chain; if three chain wheels are arranged in succession, their shaft spacing will be about equal to one third of the pitch.

The only drawback of using pairs of chain wheels rotating in parallel planes lies in the fact that the driven element of the chain must have a width sufficient to accommodate the driving elements which must rotate next to each other. To avoid an asymmetrical transmission of the drive it will be desirable to provide at least one of the successive chain wheels with a coaxial complementary chain wheel having its driving elements disposed similarly to those on the first wheel so that the driving elements can engage alternately in the middle of the driven elements and symmetrically on both sides of such elements.

Chain wheels rotating in the same plane can also be arranged one behind the other. This has the advantage that the driven elements of the chain can be narrower and in addition it renders it possible to reduce the height of the apparatus. With this arrangement however the advantages obtainable by the invention depend on the pitch of the chain remaining constant with sufficient accuracy; this will only be the case if the chain links are practically without mutual play in the direction of the chain run so that they cannot be pushed into each other, and if they are prevented from jamming. For coplanar rotation, the spacing of the chain wheel shafts must be somewhat greater than the diameter of a wheel.

In order that the driving elements of one chain wheel or group of chain wheels may be released by the elements of the other wheel or wheels with all possible uniformity, the driving elements of one chain wheel or group thereof are arranged so that their angular positions about the wheel centre are displaced relatively to the driving elements of the following wheel or group in the direction of the chain run by preferably $$\frac{360°}{an}$$

where $a$ is the number of the successively arranged chain wheels or groups thereof and $n$ is the number of driving elements on each wheel. If therefore there are twelve driving elements on each chain wheel and if two chain wheels or groups thereof, I and II, are arranged in succession in the direction of the chain run, or three wheels or groups I, II, III are so arranged, and in both cases the driving elements of group I stand at 0°, 30°, 60°, 90° etc., in the first case the driving elements of group II will stand at 15°, 45°, 75°, 105° etc., while in the second case the driving elements of group II will be at 10°, 40°, 70°, 100° etc., and the elements of group III at 20°, 50°, 80°, 110° etc.

By connecting the successive chain wheels or groups thereof with one another the fixed angular displacement of 15°, for example, between the two or more wheels or groups is maintained throughout their rotation. From the examples given it will be seen that with the second arrangement mentioned above the changeovers of the drive from wheels I to II and from wheels II to III occur similarly to each other and to the changeover from wheels III to I.

Of course it is also possible to displace the driving elements on the various chain wheels otherwise than as above if certain definite effects are aimed at. For example with chain wheels having twelve driving elements each, when the driving elements of group I stand at 0°, 30°, etc., those of group II can stand at 12°, 42°, etc., and those of group III at 24°, 54°, etc. so that when the chain wheels successively engage the chain there first occurs a uniform difference of 12° on changeover between wheels I and II and from II to III while on the third changeover from III to I there occurs a difference of only 6°. This succession (12°:12°:6°) is independent of the direction of movement of the chain i. e., in whichever direction the chain may move, each time a driven element is passed on from the first wheel or group coming into engagement with it to the next group, we have the difference of 12° and when the driving element of the last group is released by an element of the first group engaging the next driven element we have the difference of 6°.

The point at which a slowing down driving element of the wheel or group which first engages a driven element is released by a faster driving element of the following wheel or group is, in the case of chain wheels rotating in parallel planes and direct passing of the driven element from group to group, determined solely by the mutual angular displacement of the driving elements and by the ratio of the distance separating the wheel axes to the wheel diameter on the one hand and by the angular position of the driven elements on the other hand. The point of release of the slowing down driving element of the last chain wheel in succession by a faster driving element of the first chain wheel engaging a succeeding driven element is, in addition, affected by the pitch of the chain.

If more than two groups of chain wheels are arranged behind one another the changeover of the drive from group I to group II and from group II to group III suitably takes place at the same angular position of the respective elements, which can be adjusted by alteration of the distance between the chain wheels and/or their diameter. If the angular position is adjusted to 0° and if the elements on the successive wheels are angularly displaced by 12°, the element of the first wheel to engage which stands at 12° is released by the element of the following wheel which stands at 0°. If the angular position of changeover is adjusted to 3° then with the same angular displacement the driving element of the following wheel at 3°.

If the chain pitch is exactly three times as great as the distance between the axes of the three successive chain wheels, and if the angular displacement between elements of successive wheels is one-third of the angle between adjacent driving elements on a wheel, then the release of a driving element of the third wheel by a driving element of the first wheel engaging with the succeeding driven element takes place at the same angular position. If on the other hand the chain pitch is somewhat larger or smaller, the release of a driving element of the last chain wheel by an element of the first wheel takes place correspondingly earlier or later. If therefore, owing to inaccuracies in manufacture, wear or the like, the pitch of the chain is not altogether uniform a driving element of the last wheel will be released correspondingly earlier or later, while at the same time the arcs traversed by the driving elements of the first wheel, while in driving engagement, will vary from time to time.

Conveniently, the chain wheels are adjusted so that with normal chain pitch the driving elements of each chain wheel engage the driven elements at the highest point of their rotation and are released after $$\frac{360°}{an}$$

by driving elements of another wheel or group engaging with the same or other driven elements.

The most suitable shape of the driving and driven elements is fixed by the consideration discussed at the beginning of the specification.

It will be evident that by an arrangement according to the invention of several chain wheels one behind the other further advantages may be obtained in the operation of the driving apparatus; thus the distance which the driving elements travel up or down on the driven elements can be kept very small because several driving elements co-operate in the driving of each driven element.

Since the chain wheels can be adjusted so that their driving elements first come into engagement at the highest point of their rotation, i. e., only drive as they descend away from the chain any upwardly directed pressures of the driving elements on the driven elements can be prevented.

If the driving elements travel dowward on the driven elements, they tend, it is true, to carry the driven elements downward by friction. However the obliquity of the engagement faces of the driven elements can be made equal to the angle of friction between the material of the driving and driven elements. The upward pressure of the driving against the driven elements may thus be counteracted by the downward frictional forces of the driving element travelling downward on the driven element.

If the plane engagement faces of the driven elements of the chain form an angle with the direction of movement, in the plane of rotation of the chain wheels, which is somewhat less than 90°, when the gaps between the elements become wider in the direction of the chain wheels, further advantages may be obtained, as in the case of the apparatus described below with reference to the drawings. In particular, with such a design the invention may be applied to constructions using only a soingle chain wheel instead of several wheels in succession.

The invention will be further described, by way of example, with reference to the accompanying drawings, in which:

Figure 1 and 2 illustrate diagrammatically various positions of a chain wheel in relation to the driven elements of a chain: in Figure 1 the driven elements have engagement faces which are perpendicular to the direction of movement of the chain, while in Figure 2 the engagement faces diverge from the perpendicular by 9°.

Figures 3 and 4 each illustrate, also diagrammatically, two different positions of two chain wheels arranged one behind the other in the direction of the chain run; in Figure 3 the wheels are engaged with a chain the engagement faces of which are perpendicular to the chain run and in Figure 4 the wheels are in engagement with a chain where the engagement faces diverge from the perpendicular by 9°.

Figure 8 is a sectional plain view on the line VIII—VIII of Figure 9, and Figure 9 is a longitudinal section on the line IX—IX of Figure 8.

In the following discussion the assumption is made that the chain wheels illustrated rotate with uniform velocity. All the driving elements shown therefore rotate with uniform velocity, and the driving elements of two co-operating chain wheels always have the same speed of rotation. The fact of which use is made, however, is not the constant speed of rotation of the driving elements and the constant distance between adjacent elements, but the distances of these elements from each other referred to a plane perpendicular to the engagement faces of the driven elements which distances are always changing, and the speed of each driving element referred to said plane which varies by reason of its changing position relative to the driven elements of the chain. These speeds will be the same whether the driving elements are in fact driving in the intended direction of movement or braking in the opposite direction or whether at the moment the driving elements are actually in engagement with the driven elements or are moving into or out of such engagement. Where, below, speeds or distances of the driving elements are referred to, such expressions, which will be used for brevity without further qualification, are generally to be understood to have the meaning just mentioned.

Figure 1:
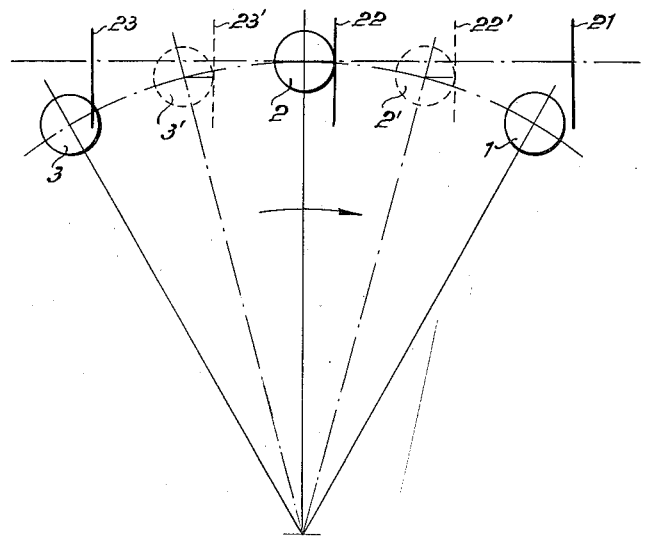

In Figure 1 successive driving elements of the form indicated are denoted by the numerals 1, 2, 3, etc. and are disposed at 30° from each other about the periphery of a chain wheel, there being twelve elements on the complete wheel. Elements 2', 3' shown chain dotted indicate the positions of the elements 2 and 3 after a rotation of the chain wheel by 15°. Numerals 21, 22 and 23 denote successive driven elements of a chain which elements are perpendicular to the direction of movement of the chain: numerals 22' and 23' show the positions of the elements 22 and 23 after a 15° rotation of the chain wheel. The pitch of the chain corresponds to the distance between adjacent driving elements. The different speeds of the driving element are clearly illustrated by the fact that the driven element 21 has advanced in front of the element 1, because the driving element 2 and therefore the driven element it engages moves faster than the element 1 which is thus smoothly released from engagement.

The driving element 3, on the other hand, cannot properly engage as it lies beneath the element 23. As its distance from the element 2 is less than the pitch of the chain it cannot possibly place itself in driving engagement behind the driven element. Only when the chain wheel has rotated by 15° does its distance from the preceding driving element become sufficiently great—because since the element 2 moves faster than the element 3 these elements have had to move apart from each other— for it to engage properly behind the driven element 23' and drive it forward so as to release the element 2' which is now slowing down. Proper functioning of the drive with the given pitch of the chain would only be conceivable if either (1) the driving elements could be temporarily lowered radially; however, at the moment when they can go into the working position behind the driven elements of the chain they would immediately have to take up the full load and release the driving elements acting hitherto; or if (2) the driven elements of the chain were bevelled at their tips, the bevelled face sloping towards the chain wheel: the releasing driving element 3' would then have to take over the drive when at the extreme lower edge of the perpendicular engagement face adjacent the bevelled face while the element 2' hitherto driving the chain through the driven element 22' was released from engagement also when at the same lower edge of the respective engagement face. These possibilities are therefore of a purely theoretical interest and can hardly be realised in practice.

With a chain of smaller pitch a faultless release of the successive driving elements can be obtained, but this smaller pitch means that such a drive can only be used with a chain with very small pitch or, alternatively, relatively large chain wheels must be used.

Figure 2:
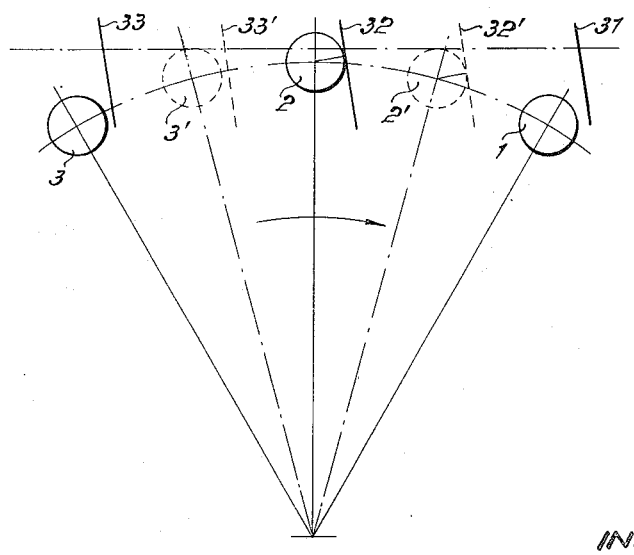

A far more favourable arrangement is shown in Figure 2, in which a chain wheel of approximately the same size as that of Figure 1 is shown in similar position in engagement with a chain of the same pitch, the driven elements 31, 32, 33 of which are, however, not an angle of 90° but at an angle of 81° to the direction of movement of the chain, i. e. they diverge from the vertical by an angle of 9°. From the drawing it will be seen that not only is the element 1 released smoothly from driving engagement but, in contrast to Figure 1 the driving element 3 also enters smoothly into engagement. In addition, with the chain pitch shown, the element 3 releases the element 2, not at minus 15° but later in its rotation.

This more satisfactory arrangement is explained mathematically by the fact that the pitch of the chain (measured as of course it must be in the direction of movement of the chain) is always greater than the distances between the driving elements measured in a direction perpendicular to the engagement faces of the driven elements. The point at which the driving elements attain their maximum speed no longer coincides with the highest point of their rotation and is displaced from that point towards the beginning of the path traced out by a driving element while moving in engagement with a driven element. If the path extends from minus 30° to plus 30°, then, with the driven elements of the design shown in Figure 1 the driving element attains its maximum speed at 0° and has the same speed at the beginning and end of the path. When the driven elements are designed as shown in Figure 2 the driving elements reach their maximum speed at minus 9° and enter the engagement path at a relatively high speed. As the change of speed per degree increases rapidly with the angular distance from the highest point of the speed curve a corresponding improvement is obtained in the mode of action of the chain wheel. When the chain wheel works in the opposite direction we have the same conditions as if reflected in a mirror. The apparatus can therefore act in both directions, and on both upper and lower runs of the chain, both as a drive and as a brake and it can drive the upper run while it brakes the lower run, or vice versa.

The only disadvantage of the apparatus according to Figure 2 is the fact that the driving elements engaging in the chain exert an upward pressure thereon until they have reached the highest point of their rotation. (After passing this point this pressure can, as stated above, be compensated by the fact that the drivers now travelling downwards on the engagement faces of the driven elements tend to carry them downwards by friction.) When using apparatus with several chain wheels in succession it is preferred that the driving elements only begin to drive at the highest point of their rotation. But even when only one single chain wheel is used, this result can be obtained by a slight reduction of the chain pitch or enlargement of the chain wheel.

While the alterations just mentioned were necessary in the apparatus according to Figure 1 in order to make it workable at all, they are here made only for the purpose of still further improving the driving action. Apparatus according to Figure 1 can be put out of operation altogether by nonuniformity of chain pitch such as can occur through inaccuracies in manufacture or through wear, while the same differences cause only a slight deterioration in the action of apparatus according to Figure 2. Besides this, in apparatus according to Figure 1, the driving elements, travelling first upwards on the engagement faces of the driven elements and then downwards thereon, cannot be prevented from tending to carry the driven elements with them by friction in both directions. In apparatus according to Figure 2 such upward travel can be eliminated while the friction in the downward direction can be compensated by the pressure acting between the driving and driven elements.

The idea of allowing chain wheels to act on engagement surfaces of a chain arranged obliquely to its direction of movement is applicable with great advantage not only when using several chain wheels arranged in succession in the direction of movement but also when using a single chain wheel.

Figure 3:
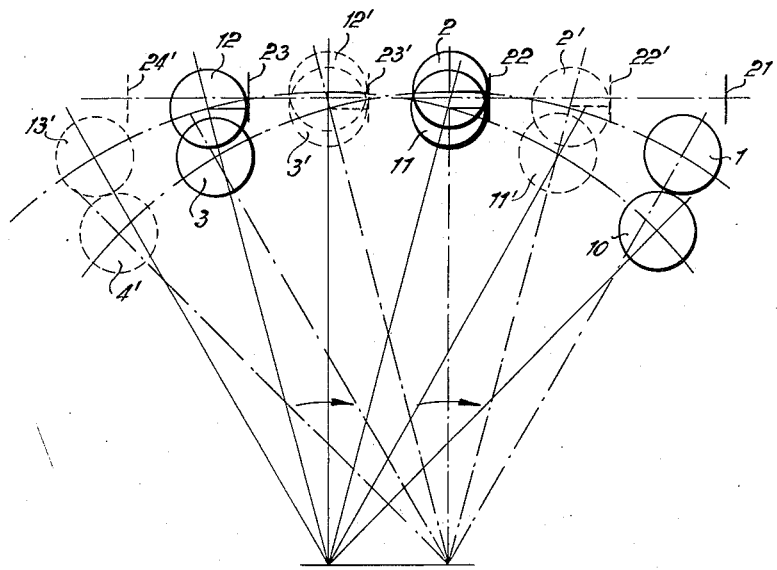
Figure 4:
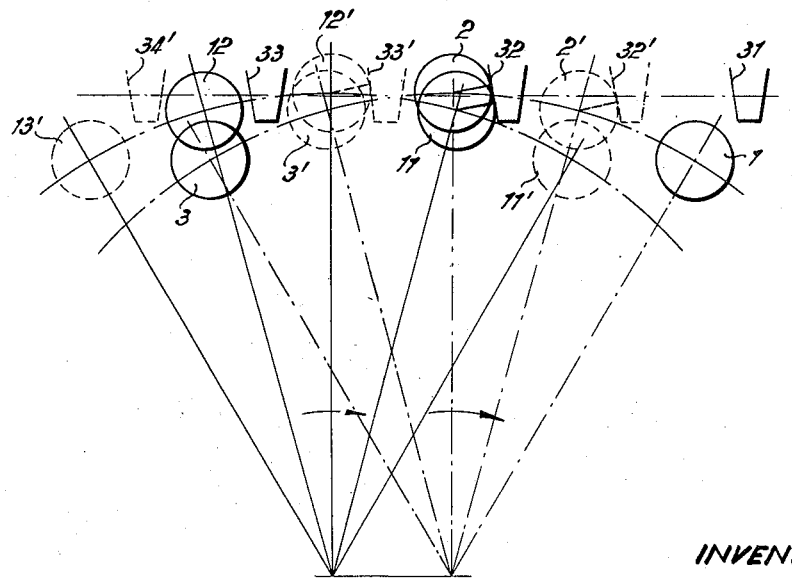

Figures 3 and 4 each show two chain wheels or pairs thereof arranged in succession in engagement with chains the driven elements of which are designed according to Figures 1 and 2 respectively. The right hand chain wheel shown chain-dotted in both figures is illustrated in each case in the same positions as in Figures 1 and 2, together with its driving elements. The left hand chain wheel the periphery and radii of which are shown in full lines is shown with its driving element 11 standing at plus 15° being released by the element 2 of the right hand wheel standing at 0°. When both chain wheels have rotated by 15° their drivers stand in positions in which their driving elements are distinguished by a prime ('), i. e. element 2 has travelled to 2', 3 to 3', 4 to 4', 11 to 11', 12 to 12' and 13 to 13'. In this position the slowing down element 2' is released in turn by the faster element 12' engaging with the following driven element of the chain.

In Figure 3 the element 3 can again to be seen positioned below the driven element 23 (and the driving element 13' under the driven element 24'). The element 3 is only placed correctly to engage the driven element when it has reached the position 3' and the driven element is at 23', but engagement is only momentary because the faster driving element 12' here overtakes the element 3 and releases the driving element 2' thereby taking over the driving of the chain. The element 12' is overtaken and released from driving engagement by the driver 3' only after a further 15° when it has been brought into the position 2. If the driven elements of the chain are made retractable radially, then when several chain wheels are arranged in succession the disturbances which were observable with a drive according to Figure 1 no longer occur.

Here too, however, apparatus with obliquely disposed driven elements according to Figure 4 has a still better action and in particular is less sensitive to inaccuracies in the chain pitch. Both sides of the driven elements 31, 32, 33 of the chain are shown in this figure in order to make it clear that the apparatus can, without any modification, driven in the direction opposite to that indicated by the arrows, and brake in both directions. Here too the position of the driving and driven elements are as reflected in a mirror when the drive works in the reverse direction.

Figure 5:
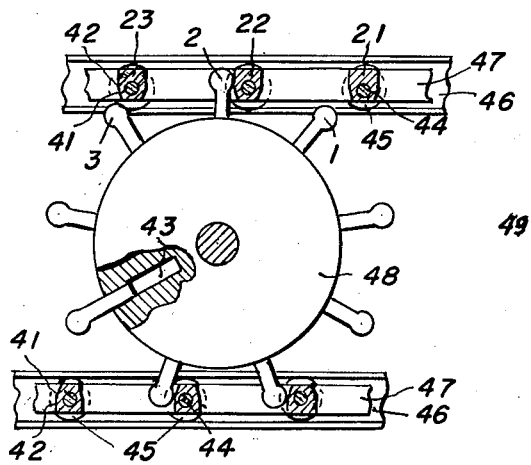
Figures 5, 6 and 7 show diagrammatically complete sprocket wheels with upper and lower chain runs driven thereby, said illustrations corresponding to the fragmentary views of Figures 1, 2 and 3, respectively.
Figure 6:
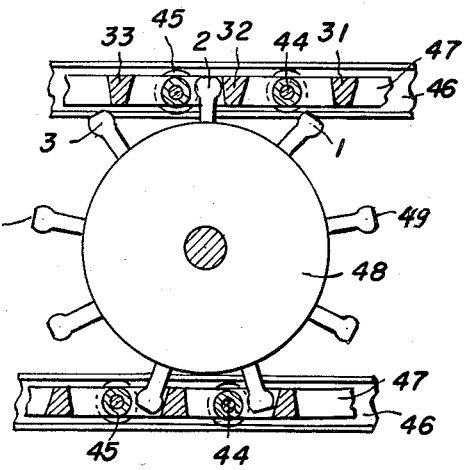
Figure 7:
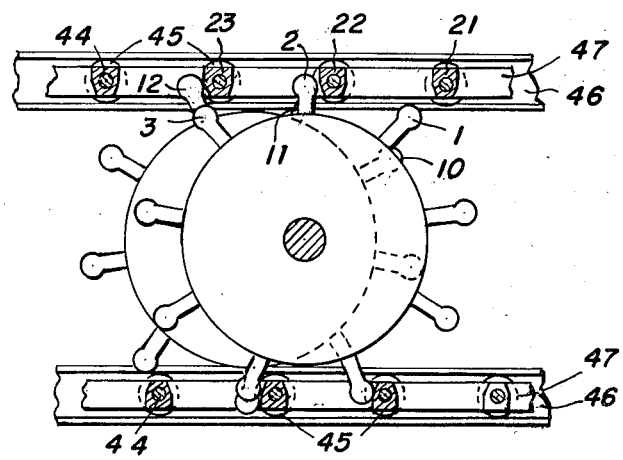

The chain wheels in Figure 3 are arranged so that the highest point in the rotation of the right hand wheel lies vertically above the point on the left hand wheel which has advanced 15° from its highest point. In Figure 4 these two points are connected by a line which runs parallel to the sloping engagement faces of the driven elements. In Figure 4 the shafts of the successive chain wheels or pairs thereof are somewhat more closely spaced than in Figure 3. In the embodiments of Figures 5, 6 and 7, the same reference numbers are used for like parts as in the corresponding Figures 1, 2 and 3.

Figure 5 corresponding to Figure 1 shows that the driven elements 21, 22 and 23, etc. of the chain 47 have faces 41 for engagement with the driving elements 1, 2, 3, etc. of a chain or sprocket wheel 48. These faces 41 are inclined and the incline starts at 42. The shanks of the driving elements are displaceably mounted in cavities or slots 43 of the sprocket wheel 48, so that they can be radially displaced therein within certain limits. The links of the chain 47 are hinged to one another at 44, where rollers 45 are pivotally mounted on the chain 47 to movably support the latter on U-shaped rails 46. The parts 44, 45 and 46 are indicated only in or on the lower run of the chain 47, through they will be provided also on the upper run.

Figures 6 corresponding to Figure 2 shows a modified embodiment. The driven elements 31, 32, 33, etc. of the sprocket wheel 48 have inclined faces along the entire sides of these elements. While the free ends of driving elements 1, 2, 3, etc., in Figure 5, are round, the outer ends of these elements in the embodiment of Figure 6 are flattened at 49. Otherwise, Figures 5 and 6 show the same construction.

Figure 7 illustrates the arrangement of a pair of chain or sprocket wheels with the associated chain runs. This embodiment corresponds to the fragmentary illustration in Figure 3. The design of the supporting members for the movable chain is the same as in Figures 5 and 6.

Figure 9:
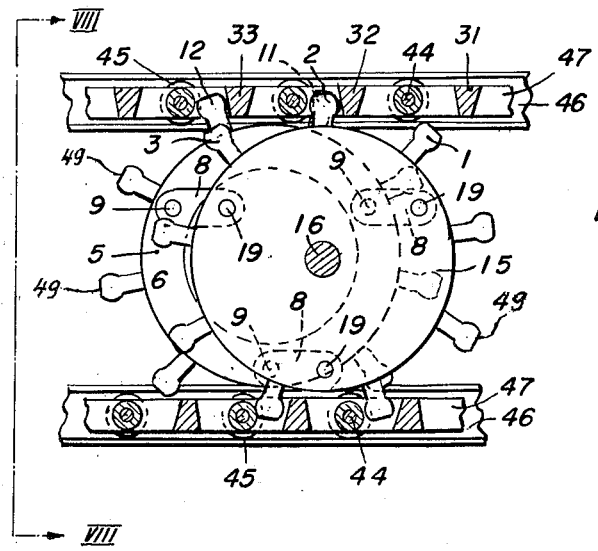
Figures 8 and 9 show diagrammatically the bearings and operative connections of two pairs of chain wheels.
Figure 8:
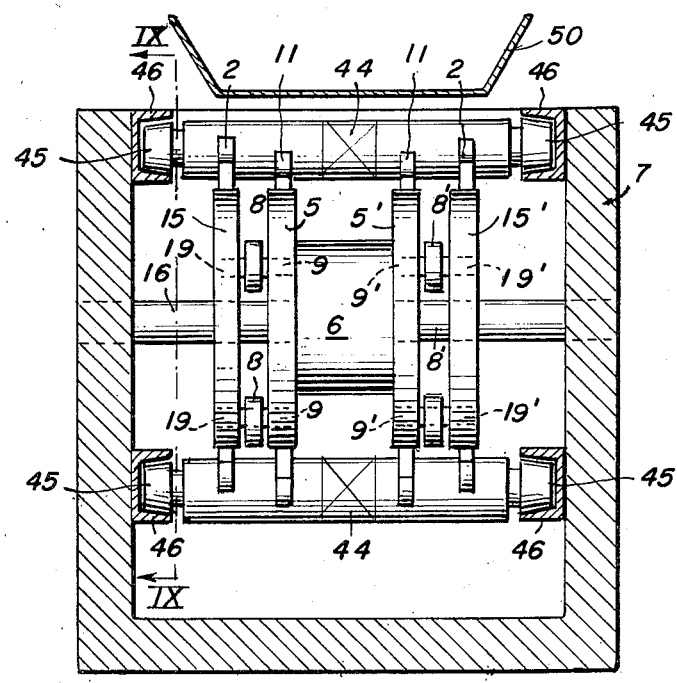

Figures 8 and 9 illustrate one way in which two pairs of chain wheels can be mounted and operatively connected to rotate in parallel planes about axes which are spaced apart in the direction of the chain run. As indicated in the drawing, an inner pair of chain wheels 5, 5' are arranged so that their driving elements engage the driven elements near to and on either side of the centre thereof, and an outer pair of wheels 15, 15' are arranged on an axis spaced in the direction of movement of the chain from the axis of the wheels 5, 5', and with their driving elements engaging the driven elements of the chain on either side of the first-mentioned driving elements. A fixed part 6 of a gear housing 7 provides a bearing for the inner pair of chain wheels 5, 5'. An eccentric bore is formed in the part 6 of the housing which accommodates the shaft 16 is preferably driven by means of a pinion not illustrated. The shaft can alternatively be mounted in other parts of the housing 7 suitably drilled for receiving it: the outer pair of chain wheels can alternatively rotate about fixed parts of the housing providing bearings while the inner pair of wheels is keyed on a shaft passed through a bore in such parts.

The chain wheels 15, 15', which are driven by way of the shaft 16, are connected by several connecting members 8, 8' with the other pair of chain wheels 5, 5' so that both pairs of chain wheels always rotate with the same speed. The connecting members 8, 8' are provided with bearing pins 9, 9' and 19, 19' which are received in corresponding holes in the chain wheels 5, 5' and 15, 15'. The centres of the bearing pins 9 and 19 and 9' and 19' respectively have the same distance from each other as the shafts of the pairs of chain wheels 5, 5' and 15, 15'.

The gear housing 7 constitutes a U-shaped frame supporting on the inside of its legs the likewise U-shaped guiding rails 46 indicated in Figures 5, 6 and 7. These rails 46 guide and support the rollers 45 rotatably mounted on both ends of the chain link pins at 44. Thus, the upper and the lower run of the chain are movably supported in and by the housing or frame 7. A conveyor band is indicated at 50 in Figure 8 above the upper chain run.

I claim:

1. Apparatus for driving an endless chain at a point intermediate in its run, including a plurality of chain wheels, means mounting the chain wheels whereby at least two said wheels are rotatable about parallel and spaced axes, means mechanically connecting the chain wheels for rotation at the same speed, driving elements fixed equidistant one from the next about the periphery of each said chain wheel the elements of one wheel differing in angular disposition from those of the other, a chain, means movably mounting the chain to present a straight run in the region of the chain wheels, and a series of elements mounted on and movable with said chain for engagement by the driving elements of both said wheels in turn so as to be driven thereby, the driving elements of one wheel being released from engagement with their respective driven elements by the engagement of succeeding driving elements of another wheel with corresponding driven elements.

2. Apparatus according to claim 1, wherein the axes of said two chain wheels are spaced apart in the direction of the chain run a distance smaller than the pitch of the chain.

3. Apparatus according to claim 1, comprising a pair of chain wheels rotatable in parallel planes about a common axis and at least one further chain wheel rotatable in a plane parallel with and between said first-mentioned planes about an axis spaced from the common axis, in the direction of the chain run, a distance smaller than the pitch of the chain.

4. Apparatus according to claim 1, wherein the two chain wheels are of the same diameter and the axes of said chain wheels are spaced apart a distance greater than said diameter and are rotatable in a common plane.

5. Apparatus according to claim 1, wherein the said difference of angular disposition is $$\frac{360°}{an}$$

where $a$ is the number of axially spaced chain wheels and $n$ is the number of driving elements on each chain wheel.

6. Apparatus according to claim 1, wherein the driving elements comprise surfaces having the form of parts of cylinders of which the axes are parallel to the axes of the chain wheels and the driven elements comprise flat faces for engagement by the part-cylindrical surfaces of the driving elements.

7. Apparatus according to claim 1, wherein the driving elements comprise surfaces having the form of parts of cylinders of which the axes are parallel to the axes of the chain wheels and the driven elements extend from the general plane of the chain in said straight run and comprise flat faces for engagement by said part-cylindrical surfaces which faces form an acute angle with the intended direction of movement of chain in said straight run.

8. Apparatus according to claim 1, wherein the driving elements comprise surfaces having the form of parts of cylinders of which the axes are parallel to the axes of the chain wheels and the driven elements extend from the general plane of the chain in said straight run and comprise each a pair of faces subtending an angle less than a right angle whereby adjacent driven elements define between them wedge-shaped spaces of progressively greater width towards the chain wheels.

9. Apparatus according to claim 1, wherein the driving elements comprise surfaces having the form of parts of cylinders of which the axes are parallel to the axes of the chain wheels and the driven elements extend from the general plane of the chain in said straight run and comprise flat faces for engagement by said part-cylindrical surfaces which faces form an acute angle with the intended direction of movement of chain in said straight run said angle being equal to the angle of friction between the engagement surfaces of the driving and driven elements.

10. Apparatus for driving an endless chain at a point intermediate in its run, including a plurality of chain wheels, means mounting the chain wheels whereby $n$ said chain wheels are rotatable about parallel axes each spaced from the next ($n$ being a positive integer greater than 1), means mechanically connecting the chain wheels for rotation together at the same speed, a series of $a$ (being a positive integer) driving elements fixed equidistant one from the next about the periphery of each said chain wheel, the elements of one of said $n$ wheels differing in angular disposition from those of the next of said wheels by $$\frac{360°}{an}$$

a chain, means movably mounting the chain to present a straight run in the region of the chain wheels, and a series of elements mounted on and movable with said chain for engagement by the driving elements, the chain pitch, axial separation of said $n$ wheels, and wheel diameter being such that each driving element comes into engagement with a driven element when the radius of the respective chain wheel through it forms a right angle with the direction of said run and disengages from said driven element after movement of the chain wheel through $$\frac{360°}{an}$$

by reason of engagement of a driven element by a driving element of another of said $n$ wheels.

11. Apparatus for driving an endless chain at a point intermediate in its run, including at least one chain wheel having driving elements fixed equidistant one from the next about the periphery of said wheel, means rotatably mounting the chain wheel, a chain, means movably mounting the chain to present a straight run in the region of the chain wheel, and a series of elements movable with said chain and presenting, when in said straight run, faces forming an acute angle with the direction of movement of the chain in said run, which faces are engageable by the driving elements so as to be driven thereby, each driving element being released in turn from driving engagement by the coming into engagement of a succeeding driving element having at engagement, a greater component of speed in the direction perpendicular to said faces than said first mentioned driving element at release.

12. Apparatus according to claim 11, said engagement faces being circumferentially spaced so that the engagement between the driving elements and the driven elements starts at a point where the chain wheel radius between engaging elements forms a right angle with respect to the direction of movement of said chain in said run.

13. Apparatus according to claim 11, comprising at least two said chain wheels, means mounting the chain wheels for rotation about parallel axes spaced apart in the direction of said chain run, means mechanically connecting the chain wheels for rotation together at the same speed with the driving elements on one wheel differing in angular disposition from those on the other, the driving and driven elements being disposed to effect release of the driving element from driving engagement by the coming into engagement of succeeding driving and driven elements at a position where the radius of the chain wheel through the engaging driving element forms a right angle with the direction of said run.

14. Apparatus according to claim 11, comprising two pairs of said chain wheels, means mounting the chain wheels for rotation in spaced parallel planes with the wheels of one pair one on either side of the other pair and each pair rotatable on one axis the axes being spaced apart in the direction of said chain run, and means mechanically connecting the chain wheels for rotation together at the same speed with the driving elements of one pair of wheels differing in angular disposition from those of the other.

15. Apparatus according to claim 11, comprising two pairs of said chain wheels, means mounting the chain wheels for rotation in spaced parallel planes with the wheels of one pair one on either side of the other pair and each pair rotatable on one axis the axes being spaced apart in the direction of said chain run, and means mechanically connecting the chain wheels for rotation together at the same speed with the driving elements of one pair of wheels differing in angular disposition from those of the other, said connecting means comprising a plurality of members each rotatably mounted at one end for angular movement abut an axis fixed with respect to one wheel and parallel to said wheel axes, and at the other end for angular movement about an axis fixed with respect to the adjacent wheel of the other pair and parallel to said wheel axes, the length of said member between said axes being equal to the distance between the two axes of said two pairs of chain wheels.

16. Apparatus according to claim 11, comprising two pairs of said chain wheels, means mounting the chain wheels for rotation in spaced parallel planes with the wheels of one pair one on either side of the other pair and each pair rotatable on one axis the axes being spaced apart in the direction of said chain run, and means mechanically connecting the chain wheels for rotation together at the same speed with the driving elements of one pair of wheels differing in angular disposition from those of the other, said mounting means including a fixed bearing member having an outer bearing surface co-operating with the walls of central bores in the wheels of one said pair thereof and a shaft located in an eccentric bore in said bearing member mounting the wheels of said other pair.

17. Apparatus for driving an endless chain at a point intermediate in its run, including a plurality of chain wheels, means mounting the chain wheels whereby at least two said wheels are rotatable about parallel and spaced axes, means mechanically connecting the chain wheels for rotation at the same speed, and a series of driving elements fixed equidistant one from the next about the periphery of each chain wheel to drivingly engage a chain, said elements on one wheel differing in angular disposition relatively to the chain from those of the other wheel.

18. In combination a chain and cooperating sprocket drive, in which said chain is tangentially engaging at least one sprocket wheel of said drive, driving elements on the periphery of said sprocket wheel spaced equidistant from one another, driven members on said chain spaced equidistant from one another, abutment faces on said driven members adapted to be engaged by said driving elements, said abutment faces being parallel with respect to one another in a run of the chain, and being disposed transversely on said driven members in planes at an angle greater than 90° with respect to the longitudinal axis of said chain.

19. In combination according to claim 18, said planes being disposed at an angle of about 99° with respect to the longitudinal axis of said chain.

20. In combination according to claim 18, wherein said driving elements on said sprocket wheel are equipped at their places of engagement with said driven members with contact means curved in such a manner that the engagement takes place merely along lines across said abutment faces.

21. In combination according to claim 18, wherein said contact means are of cylindrical shape.

References Cited in the file of this patent
UNITED STATES PATENTS

| | | |
|---|---|---|
| 511,012 | Godbery | Dec. 19, 1893 |
| 1,201,748 | Luce | Oct. 17, 1916 |
| 2,226,010 | Moorhouse | Dec. 24, 1940 |
| 2,667,791 | Bremer | Feb. 2, 1954 |